(12) United States Patent
Lv

(10) Patent No.: US 8,982,940 B2
(45) Date of Patent: Mar. 17, 2015

(54) ADAPTIVE EQUALIZATION METHOD AND ADAPTIVE EQUALIZER

(71) Applicant: Huawei Technologies Co., Ltd., Shenzhen (CN)

(72) Inventor: Rui Lv, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 134 days.

(21) Appl. No.: 13/868,623

(22) Filed: Apr. 23, 2013

(65) Prior Publication Data

US 2013/0230090 A1 Sep. 5, 2013

Related U.S. Application Data

(63) Continuation of application No. PCT/CN2012/070710, filed on Jan. 21, 2012.

(51) Int. Cl.
*H03H 7/30* (2006.01)
*H03H 7/40* (2006.01)
(Continued)

(52) U.S. Cl.
CPC .......... *H04L 25/03885* (2013.01); *H04L 27/22* (2013.01); *H04L 27/38* (2013.01);
(Continued)

(58) Field of Classification Search
CPC .............. H04L 2025/03598; H04L 25/03885; H04L 25/0305; H04L 25/0307
USPC .................................. 375/232, 233; 708/323
See application file for complete search history.

(56) References Cited

U.S. PATENT DOCUMENTS 5,311,546 A * 5/1994 Paik et al. .................. 375/232
5,793,807 A * 8/1998 Werner et al. ............. 375/233
(Continued)

FOREIGN PATENT DOCUMENTS

CN 1764175 A 4/2006
CN 101098416 A 1/2008
(Continued)

OTHER PUBLICATIONS

Abrar, S., "Compact constellation algorithm for blind equalization of QAM signals," Networking and Communication Conference, 2004. INCC 2004. International, vol., No., pp. 170,174, Jun. 11-13, 2004.*
(Continued)

*Primary Examiner* — Daniel Washburn
*Assistant Examiner* — Amneet Singh
(74) *Attorney, Agent, or Firm* — Brinks Gilson & Lione

(57) ABSTRACT

The present disclosure relates to the field of network communication, and specifically discloses an adaptive equalization method, including: obtaining a first filtered signal according to a first filter coefficient; deciding the first filtered signal based on an original constellation map to obtain a first decision signal, and deciding the first filtered signal based on a level (n−1) constellation map to obtain a level (n−1) pseudo decision signal; if average energy of the level (n−1) error signal is less than a level (n−1) threshold, switching the level (n−1) constellation map to a level n constellation map; obtaining a second filter coefficient according to the update magnitude; obtaining a second filtered signal according to the second filter coefficient; and deciding the second filtered signal based on the original constellation map to obtain a second decision signal. Embodiments of the present disclosure also disclose an adaptive equalizer.

8 Claims, 5 Drawing Sheets

(51) Int. Cl.
*H03K 5/159* (2006.01)
*H04L 25/03* (2006.01)
*H04L 27/22* (2006.01)
*H04L 27/38* (2006.01)

(52) U.S. Cl.
CPC .............. *H04L2025/0342* (2013.01); *H04L 2025/03598* (2013.01); *H04L 25/0305* (2013.01); *H04L 2025/03477* (2013.01); *H04L 2025/03662* (2013.01); *H04L 2025/037* (2013.01)
USPC .......................... 375/232; 375/233; 708/323

(56) References Cited

U.S. PATENT DOCUMENTS

| | | | | |
|---|---|---|---|---|
| 5,940,440 | A * | 8/1999 | Werner et al. | 375/231 |
| 6,069,917 | A * | 5/2000 | Werner et al. | 375/233 |
| 6,816,548 | B1 * | 11/2004 | Shiue et al. | 375/233 |
| 7,006,565 | B1 * | 2/2006 | Endres et al. | 375/233 |
| 2003/0227968 | A1 * | 12/2003 | Kim et al. | 375/233 |
| 2004/0013190 | A1 * | 1/2004 | Jayaraman et al. | 375/233 |
| 2004/0252754 | A1 * | 12/2004 | Wood et al. | 375/232 |
| 2006/0089957 | A1 | 4/2006 | Kim et al. | |
| 2007/0201544 | A1 | 8/2007 | Zhu et al. | |
| 2008/0107168 | A1 * | 5/2008 | Xia et al. | 375/233 |
| 2008/0232453 | A1 * | 9/2008 | Cohen et al. | 375/232 |
| 2008/0291335 | A1 * | 11/2008 | Markman | 348/725 |
| 2009/0245342 | A1 * | 10/2009 | Graffouliere | 375/232 |

FOREIGN PATENT DOCUMENTS

| | | |
|---|---|---|
| CN | 101106386 A | 1/2008 |
| WO | WO 2005/112582 A2 | 12/2005 |

OTHER PUBLICATIONS

Abrar, S., "A Family of Reduced-Constellation Algorithms for Blind Equalization of Square-QAM Signals," Microelectronics, 2005. ICM 2005. The 17th International Conference on , vol., No., pp. 296,300, Dec. 13-15, 2005.*

He, Lin; Amin, M.G.; Reed, C., Jr.; Malkemes, R.C., "A hybrid adaptive blind equalization algorithm for QAM signals in wireless communications," Signal Processing, IEEE Transactions on , vol. 52, No. 7, pp. 2058,2069, Jul. 2004.*

Weiwei Zhou; Nelson, J.K.; Gupta, A.S., "Adaptive maximal asymptotic efficiency equalization using constellation mapping," Digital Signal Processing Workshop and IEEE Signal Processing Education Workshop (DSP/SPE), 2011 IEEE , vol., No., pp. 42,47, Jan. 4-7, 2011.*

Geng et al., "Research on the variable step adaptive equalizer based on Versoria function" Laboratory Science, vol. 13, No. 4, Aug. 2010, 3 pages.

Goel et al., "Dynamic Algorithm Transforms for Low-Power Reconfigurable Adaptive Equalizers" IEEE Transactions on Signal Processing, vol. 47, No. 10, Oct. 1999, 12 pages.

International Search Report issued in corresponding PCT Application No. PCT/CN2012/070710; mailed Nov. 8, 2012.

Butterweck, H. J. "A Steady-State Analysis of the LMS Adaptive Algorithm without Use of the Independence Assumption" Eindhoven University of Technology, Department of Electrica Engineering. IEEE 1995:1404-1407.

Butterweck, Hans J. "A Wave Theory of Long Adaptive Filters" IEEE Transactions on Circuits Systems—I.: Fundamental Theory and Applications vol. 48 No. 6 Jun. 2001:739-747.

* cited by examiner

ADAPTIVE EQUALIZATION METHOD AND ADAPTIVE EQUALIZER

CROSS-REFERENCE TO RELATED APPLICATIONS

This application is a continuation of International Application No. PCT/CN2012/070710, filed on Jan. 21, 2012, which is hereby incorporated by reference in its entirety.

FIELD

The present disclosure relates to the field of network communication technologies, and in particular, to an adaptive equalization method and an adaptive equalizer.

BACKGROUND

In a wireless communication system, multi-path components on a transmission channel and the non-linear feature of devices cause inter-code crosstalk for transmission signals in the system. The adaptive equalization technology can compensate and trace distortion in a transmission system, and cancel the inter-code crosstalk of the transmission signals. Therefore, this technology is widely used in the wireless communication system.

The performance of an adaptive equalizer is assessed mainly based on the convergence speed, convergence error, and blind equalization convergence feature. In environments of burst communication and high-speed communication, the adaptive equalizer is required to have higher performance.

In the prior art, the convergence speed and convergence error of the adaptive equalizer are adjusted by modifying the iterative update step parameter or iterative update algorithm of a coefficient updating unit in the adaptive equalizer. In this way, the performance of the adaptive equalizer is improved. However, due to the limitation of inherent features of the filter in the adaptive equalizer, convergence speed adjustment and convergence error adjustment by the coefficient updating unit restrict each other. To be specific, when performance of one of the convergence speed and convergence error is improved, performance of the other deteriorates. In addition, this method cannot improve the blind equalization convergence capability.

SUMMARY

Embodiments of the present disclosure provide an adaptive equalization method and an adaptive equalizer to solve the problem that convergence speed adjustment and convergence error adjustment restrict each other and that the blind equalization convergence capability cannot be improved in the prior art.

The embodiments of the present disclosure employ the following solutions:

In one aspect, the present disclosure provides an adaptive equalizer. The adaptive equalizer includes: a filter, configured to filter input signals according to a first filter coefficient to obtain a first filtered signal, and further configured to filter the input signals according to a second filter coefficient to obtain a second filtered signal; a coefficient updating unit, configured to buffer the input signals to obtain buffer signals, and further configured to obtain an update magnitude of the filter coefficient according to a level (n−1) error signal and the buffer signals, and obtain the second filter coefficient according to the update magnitude; a standard decider, configured to decide the first filtered signal based on an original constellation map to obtain a first decision signal, and further configured to decide the second filtered signal based on the original constellation map to obtain a second decision signal; a level decider, configured to decide the first filtered signal based on a level (n−1) constellation map to obtain a level (n−1) pseudo decision signal, and further configured to switch the level (n−1) constellation map to a level n constellation map if average energy of the level (n−1) error signal is less than a level (n−1) threshold, where the level n constellation map is the original constellation map; and a comparator, configured to compare the level (n−1) pseudo decision signal with the first filtered signal to obtain the level (n−1) error signal; where n is a positive integer greater than 1.

In another aspect, the present disclosure provides an adaptive equalization method. The method includes: filtering input signals according to a first filter coefficient to obtain a first filtered signal, and buffering the input signals to obtain buffer signals; deciding the first filtered signal based on an original constellation map to obtain a first decision signal, and deciding the first filtered signal based on a level (n−1) constellation map to obtain a level (n−1) pseudo decision signal; comparing the level (n−1) pseudo decision signal with the first filtered signal to obtain a level (n−1) error signal; if average energy of the level (n−1) error signal is less than a level (n−1) threshold, switching the level (n−1) constellation map to a level n constellation map, where the level n constellation map is the original constellation map; and obtaining an update magnitude of the filter coefficient according to the level (n−1) error signal and the buffer signals, and obtaining a second filter coefficient according to the update magnitude; filtering the input signals according to the second filter coefficient to obtain a second filtered signal; and deciding the second filtered signal based on the original constellation map to obtain a second decision signal; where n is a positive integer greater than 1.

The adaptive equalization method and the adaptive equalizer provided in the embodiments of the present disclosure are capable of maintaining inherent features of the filter in the adaptive equalizer, and improving the convergence speed and blind equalization convergence capability while ensuring the convergence error.

BRIEF DESCRIPTION OF THE DRAWINGS

To illustrate the solutions in the embodiments of the present disclosure more clearly, the following briefly describes the accompanying drawings required for describing the embodiments of the present disclosure. Apparently, the accompanying drawings in the following description merely show some embodiments of the present disclosure, and persons of ordinary skill in the art can derive other drawings from these accompanying drawings without creative efforts.

DETAILED DESCRIPTION OF THE EMBODIMENTS

Figure 1:
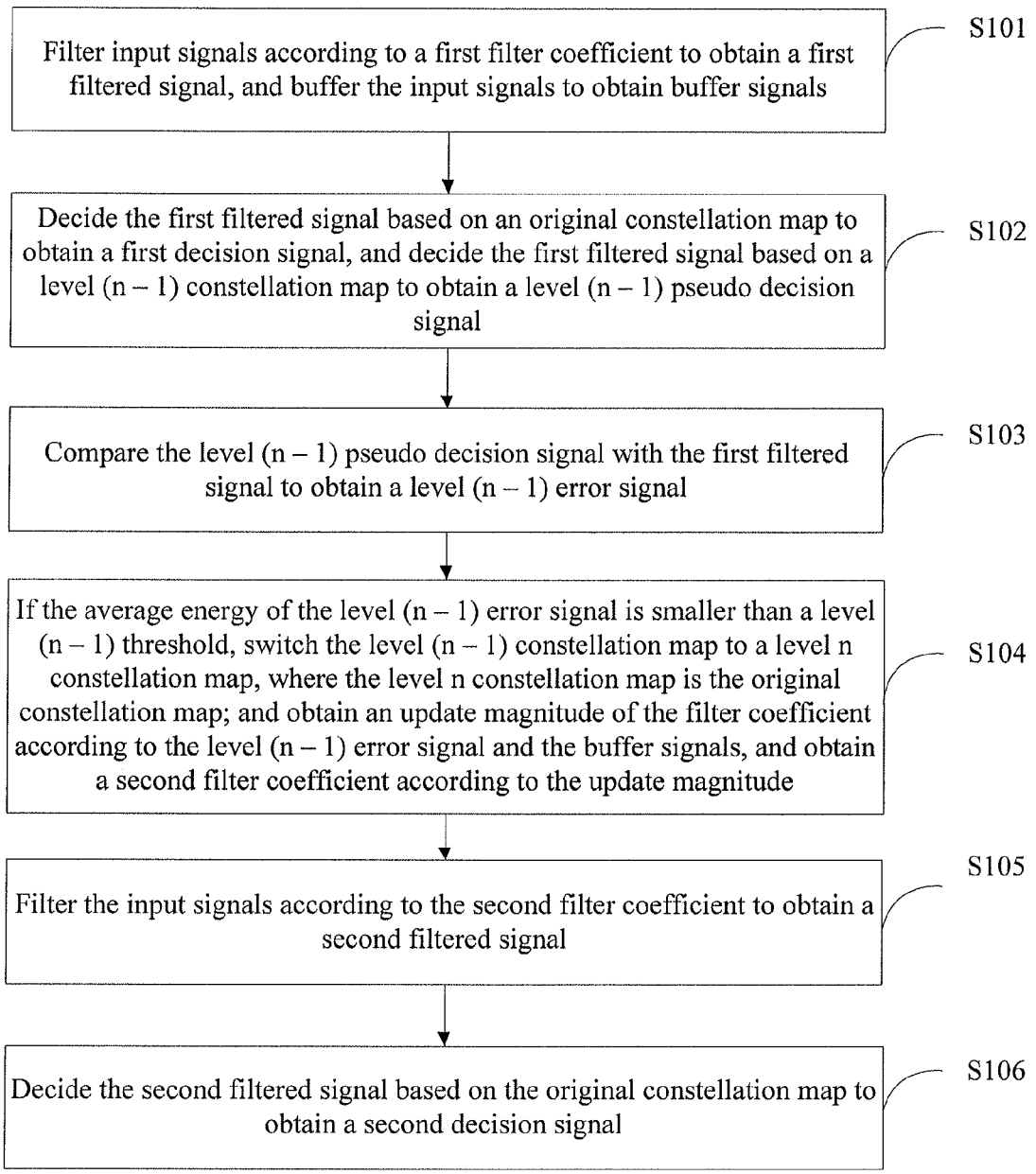
FIG. 1 is a flowchart of an adaptive equalization method according to an embodiment of the present disclosure.

Embodiments of the present disclosure provide an adaptive equalization method and an adaptive equalizer. For better understanding of the solutions of the present disclosure, the following describes in detail the embodiments of the present disclosure with reference to accompanying drawings.

It should be definite that, the described embodiments are only a part of the embodiments of the present disclosure rather than all the embodiments. All other embodiments obtained by persons of ordinary skill in the art based on the embodiments of the present disclosure without creative efforts shall fall within the protection scope of the present disclosure.

Firstly, principles of an adaptive equalization method and an adaptive equalizer according to the embodiments of the present disclosure are described.

The Butterweck iteration process of an adaptive filter reflects working principles and convergence behaviors of the adaptive equalizer, as shown in formula (1).

$$\epsilon(n+1)=(I-\mu R)\epsilon(n)+f_0(n) \quad (1)$$

I is a unit matrix; R is an autocorrelation matrix of the input signal vector of the adaptive equalizer; $\mu$ is a step parameter of the adaptive equalizer during the iteration process; $\epsilon(n)$ is an error between the actual coefficient vector w and the optimal coefficient vector $w_{op}$ of the adaptive equalizer after an $n^{th}$ iteration; and $f_0(n)$ is a random excitation function. This formula reflects a process in which the actual coefficient vector w of the adaptive equalizer gets close to the optimal coefficient vector $w_{op}$, that is, a convergence process of the adaptive equalizer during the iteration process.

In formula (1), the two parts on the right side of the equation denote different meanings.

$(I-\mu R)\epsilon(n)$ indicates inherent features of the filter in the adaptive equalizer, which not only affect the iteration speed, but also determine the stability of the convergence process.

$f_0(n)$ indicates random excitation energy during the iteration process, which directly affects the iteration speed and the update magnitude.

Further, features of the random excitation function $f_0(n)$ are shown in formula (2).

$$f_0(n) \xrightarrow{proportional\ to} \mu, J_{min}$$
$$J_{min} \xrightarrow{proportional\ to} p \quad (2)$$

$\mu$ is a step parameter of the adaptive equalizer during the iteration process; $J_{min}$ is the minimum convergence error; p is a cross-correlation parameter between a decision signal and an input signal of the adaptive equalizer, where the decision signal is an output signal of the adaptive equalizer.

Increase of the step parameter $\mu$ may increase the convergence speed, but may change the inherent features of the filter in the adaptive equalizer, which may result in instability of the adaptive equalizer and convergence failure. Increase of the cross-correlation parameter p between the decision signal and the input signal of the adaptive equalizer may also increase the convergence speed, but will not change the inherent features of the filter in the adaptive equalizer, and will not damage stability of the adaptive equalizer.

When the maximum range of the decision signal remains unchanged, reduction of the value set of the decision signal implements correlation aggregation, thereby increasing the cross-correlation parameter p between the decision signal and the input signal of the adaptive equalizer. The value set of the decision signal is reflected by the constellation map of the decision signal. Therefore, changing the constellation map of the decision signal may adjust the value set of the decision signal, thereby changing the cross-correlation parameter p between the decision signal and the input signal of the adaptive equalizer, and dynamically correcting the convergence feature of the equalizer.

In conclusion, the number of constellation points in the constellation map of the decision signal is adjusted in ascending order until the number recovers to the number of constellation points in the original constellation map. In this way, the cross-correlation parameter p changes in descending order, thereby improving the convergence speed and blind equalization convergence capability while maintaining inherent features of the filter in the adaptive equalize and the convergence error.

According to an embodiment of the present disclosure, the process of an adaptive equalization method is illustrated in FIG. 1. The method includes the following steps:

Step S101: Filter input signals according to a first filter coefficient to obtain a first filtered signal, and buffer the input signals to obtain buffer signals.

Step S102: Decide the first filtered signal based on an original constellation map to obtain a first decision signal, and decide the first filtered signal based on a level (n−1) constellation map to obtain a level (n−1) pseudo decision signal.

The level (n−1) constellation map is obtained by aggregating constellation points based on a level n constellation map, and the level n constellation map is the original constellation map.

In the four quadrants of a coordinate system, all constellation points in the level n constellation map are grouped into regular areas, where the regular areas satisfy the following two conditions: the regular areas are contiguous, and one regular area cannot be blocked by another; and the number of covered original constellation points in regular areas at the same level is the same, and the relative positions of the original constellation points in the regular areas are the same.

The centroid point of each regular area is used as a new constellation point, and the perpendicular bisector of each centroid point is used as a decision partition line for the new constellation points, to obtain the level (n−1) constellation map.

When n=2, the level (n−1) constellation map is a constellation map in a four-constellation-point quadrature amplitude modulation shape, where each quadrant includes only one constellation point.

Step S103: Compare the level (n−1) pseudo decision signal with the first filtered signal to obtain a level (n−1) error signal.

Step S104: If the average energy of the level (n−1) error signal is less than a level (n−1) threshold, switch the level (n−1) constellation map to a level n constellation map, where the level n constellation map is the original constellation map; and obtain an update magnitude of the filter coefficient according to the level (n−1) error signal and the buffer signals, and obtain a second filter coefficient according to the update magnitude.

The level (n−1) threshold is determined by the average error between the level (n−1) constellation map and the original constellation map in the aggregation area of the level (n−1) constellation map: $Td_{n-1}=\alpha \times e_{n-1}$, where $1<\alpha<1.5$; $Td_{n-1}$ indicates the level (n−1) threshold; and $e_{n-1}$ indicates the average error between the level (n−1) constellation map and the original constellation map in the aggregation area of the level (n−1) constellation map.

The aggregation area of the level (n−1) constellation map is an area covered by one constellation point in the level (n−1) constellation map in the original constellation map, and the area covered in the original constellation map is formed by partition by a decision partition line in the level (n−1) constellation map.

Step S105: Filter the input signals according to the second filter coefficient to obtain a second filtered signal.

Step S106: Decide the second filtered signal based on the original constellation map to obtain a second decision signal.

n is a positive integer greater than 1.

The following describes in detail an adaptive equalization method and an adaptive equalizer provided in the embodiments of the present disclosure with reference to the accompany drawings.

It should be definite that, the described embodiments are only a part of the embodiments of the present disclosure rather than all the embodiments. All other embodiments obtained by persons of ordinary skill in the art based on the embodiments of the present disclosure without creative efforts shall fall within the protection scope of the present disclosure.

An embodiment of the present disclosure provides an adaptive equalization method. The method includes the following steps:

Step S201: Filter input signals according to a filter coefficient to obtain a filtered signal, and buffer the input signals to obtain buffer signals.

In this embodiment, an FIR (Finite Impulse Response, finite impulse response) filter is used to filter the input signals.

Step S202: Decide the filtered signal based on an original constellation map to obtain a decision signal, and decide the filtered signal based on a level i constellation map to obtain a level i pseudo decision signal.

In this embodiment, the decision signal is a signal output after inter-code crosstalk is suppressed.

Step S203: Compare the level i pseudo decision signal with the filtered signal to obtain a level i error signal.

Step S204: If the average energy of the level i error signal is less than a level i threshold, switch the level i constellation map to a level (i+1) constellation map; and obtain an update magnitude of the filter coefficient according to the level i error signal and the buffer signals, and update the filter coefficient according to the update magnitude.

In this embodiment, if the average energy of the level i error signal is less than the level i threshold, the level i constellation map is switched to the level (i+1) constellation map; if the average energy of the level i error signal is greater than or equal to the level i threshold, the constellation map is not switched.

The level i threshold $Td_i$ is determined by the average error $e_i$ between the level i constellation map and the original constellation map in the aggregation area of the level i constellation map: $Td_i = \alpha \times e_i$, where $1 < \alpha < 1.5$.

The aggregation area of the level i constellation map is an area covered by one constellation point in the level i constellation map in the original constellation map, and the area covered in the original constellation map is formed by partition by a decision partition line in the level i constellation map. The thresholds corresponding to the decisions at all levels may be determined by calculation during the process of constructing the level decision constellation maps by aggregating the constellation points level by level.

The update magnitude of the filter coefficient is obtained according to the level i error signal and the buffer signals. For example, the update magnitude may be calculated by using common adaptive algorithms, such as LMS and RLS, according to the level i error signal and the buffer signals. The filter coefficient may be updated according to the update magnitude.

Step S205: Increase the value of i by 1 and cyclically perform the above steps until i is equal to (n−1).

Step S206: Filter the input signals according to the filter coefficient to obtain an updated filtered signal.

Step S207: Decide the filtered signal based on the original constellation map to obtain a decision signal.

In this embodiment, i<n, where i and n are positive integers.

In the above steps, the level i constellation map is obtained by aggregating constellation points based on the level (i+1) constellation map. For example, the level i constellation map is constructed by using the following method.

The level n constellation map is the original constellation map. That is, the original constellation map is used as the last level constellation map.

The level (n−1) constellation map is obtained by aggregating the constellation points based on the level n constellation map.

In the four quadrants of a coordinate system, all constellation points in the level n constellation map are grouped into regular areas, where the regular areas satisfy the following two conditions: (1) the regular areas are contiguous, and one regular area cannot be blocked by another; and (2) the number of covered original constellation points in regular areas at the same level is the same, and the relative positions of the original constellation points in the regular areas are the same.

The centroid point of each regular area is used as a new constellation point, and the perpendicular bisector of each centroid point is used as a decision partition line for the new constellation points, to obtain the level (n−1) constellation map.

Similarly, the level i constellation map is obtained by aggregating the constellation points based on the level (i+1) constellation map.

In the four quadrants of a coordinate system, all constellation points in the level (i+1) constellation map are grouped into regular areas, where the regular areas satisfy the following two conditions: (1) the regular areas are contiguous, and one regular area cannot be blocked by another; and (2) the number of covered original constellation points in regular areas at the same level is the same, and the relative positions of the original constellation points in the regular areas are the same.

The centroid point of each area is used as a new constellation point, and the perpendicular bisector of each centroid point is used as a decision partition line for the new constellation points, to obtain the level i constellation map.

When the last constellation point is obtained in the four quadrants in the constellation map respectively, the aggregation process ends. The original constellation map is symmetric. Therefore, a simplest constellation map in a four-constellation-point quadrature amplitude modulation (4-QAM) shape may be obtained. The constellation map is a level 1 constellation map. That is, the level 1 constellation map is a constellation map in a 4-QAM shape, where every quadrant includes only one constellation point.

Figure 2:
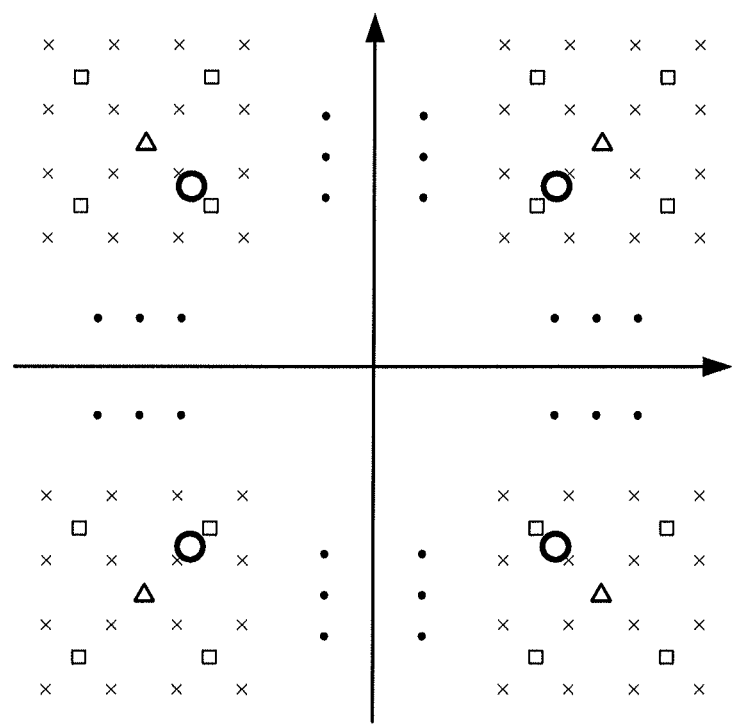
FIG. 2 is a schematic structural diagram of a level constellation map according to an embodiment of the present disclosure.
Figure 3:
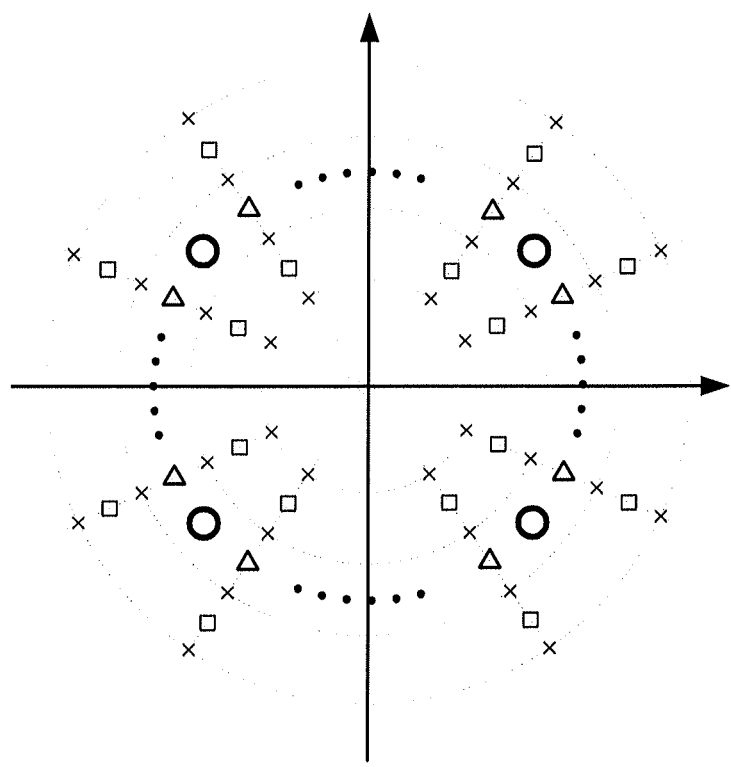
FIG. 3 is a schematic structural diagram of another level constellation map according to an embodiment of the present disclosure.

FIG. 2 and FIG. 3 show two level constellation map constructions, where:

○ indicates constellation points in the level 1 constellation map;

Δ indicates constellation points in the level (n−2) constellation map;

☐ indicates constellation points in the level (n−1) constellation map; and x indicates constellation points in the level n constellation map (original constellation map).

FIG. 2 is a rectangular constellation map, where, during level aggregation, every four adjacent constellation points are grouped into a regular area for aggregation. FIG. 3 is a round constellation map, where, during level aggregation, every two adjacent constellation points are grouped into a regular area for aggregation. The level 1 constellation maps shown in the figures are finally obtained by level aggregation.

In this embodiment, when i is equal to (n−1), the constellation map is switched to the level n constellation map. That is, the constellation map is the original constellation map. After the process of switching the constellation map of the decision signal from the level i constellation map to the original constellation map, the number of constellation points in the constellation map of the decision signal is adjusted in ascending order until the number recovers to the number of constellation points in the original constellation map. In this way, the cross-correlation parameter p changes in descending order, thereby improving the convergence speed and blind equalization convergence capability while maintaining inherent features of the filter in the adaptive equalize and the convergence error.

After step S207 is performed, adaptive equalization may be performed normally.

In another embodiment, based on the above steps, step S207 may further include deciding the filtered signal based on the level n constellation map to obtain the level n pseudo decision signal.

In this embodiment, the level n constellation map is the original constellation. Therefore, the level n pseudo decision signal is the same as the decision signal.

In another embodiment, based on the above steps, the method further includes:

Step S208: Compare the level n pseudo decision signal with the filtered signal to obtain a level n error signal.

Step S209: Obtain an update magnitude of the filter coefficient according to the level n error signal and the buffer signals, and update the filter coefficient according to the update magnitude.

In another embodiment, based on the above steps, the method further includes:

Step S210: Perform steps S206 to S209 cyclically.

In this embodiment, in initial conditions, the value of i may be any positive integer ranging from 1 to (n−1). If i=1 in initial conditions, the filtered signal is decided based on the level 1 constellation map in initial conditions to obtain the level 1 pseudo decision signal. The less the value of i in initial conditions, the higher the aggregation degree of the used constellation map. Correspondingly, the greater the cross-correlation parameter p between the decision signal and the input signal of the adaptive equalizer, the higher the convergence speed of adaptive equalization and the stronger the blind equalization convergence capability. Therefore, the level of the constellation map used in initial conditions may be selected according to different performance requirements for adaptive equalization. For example, in initial conditions, i may be equal to j, where 1≤j<n, j being a positive integer. That is, the filtered signal is decided based on a level j constellation map in initial condition to obtain a level j pseudo decision signal.

The following uses the case where n=5 and i=3 in initial conditions as an example to describe the specific process:

Step S301: Filter input signals according to a filter coefficient to obtain a filtered signal, and buffer the input signals to obtain buffer signals.

Step S302: Decide the filtered signal based on an original constellation map to obtain a decision signal, and decide the filtered signal based on a level 3 constellation map to obtain a level 3 pseudo decision signal.

Step S303: Compare the level 3 pseudo decision signal with the filtered signal to obtain a level 3 error signal.

Step S304: If the average energy of the level 3 error signal is less than a level 3 threshold, switch the level 3 constellation map to a level 4 constellation map; and obtain an update magnitude of the filter coefficient according to the level 3 error signal and the buffer signals, and update the filter coefficient according to the update magnitude.

Step S305: Filter the input signals according to the updated filter coefficient to obtain an updated filtered signal.

Step S306: Decide the updated filtered signal based on the original constellation map to obtain an updated decision signal, and decide the updated filtered signal based on the level 4 constellation map to obtain a level 4 pseudo decision signal.

Step S307: Compare the level 4 pseudo decision signal with the updated filtered signal to obtain a level 4 error signal.

Step S308: If the average energy of the level 4 error signal is less than a level 4 threshold, switch the level 4 constellation map to a level 5 constellation map; and obtain an update magnitude of the filter coefficient according to the level 4 error signal and the buffer signals, and update the filter coefficient according to the update magnitude.

Step S309: Filter the input signals according to the newly updated filter coefficient to obtain a newly updated filtered signal.

Step S310: Decide the newly updated filtered signal based on the original constellation map to obtain a newly updated decision signal.

Further, step S310 may also include deciding the newly updated filtered signal based on the level 5 constellation map to obtain a level 5 pseudo decision signal.

Further, based on the above steps, the method also includes:

Step S311: Compare the level 5 pseudo decision signal with the newly updated filtered signal to obtain a level 5 error signal.

Step S312: Obtain an update magnitude of the filter coefficient according to the level 5 error signal and the buffer signals, and update the filter coefficient according to the update magnitude.

Further, based on the above steps, the method also includes:

Step S313: Perform steps S309 to S312 cyclically.

The adaptive equalization method provided in the embodiments of the present disclosure adjusts the cross-correlation parameter p by changing the constellation map of the decision signal, thereby maintaining inherent features of the filter in the adaptive equalizer, and improving the convergence speed and blind equalization convergence capability while ensuring the convergence error.

Figure 4:
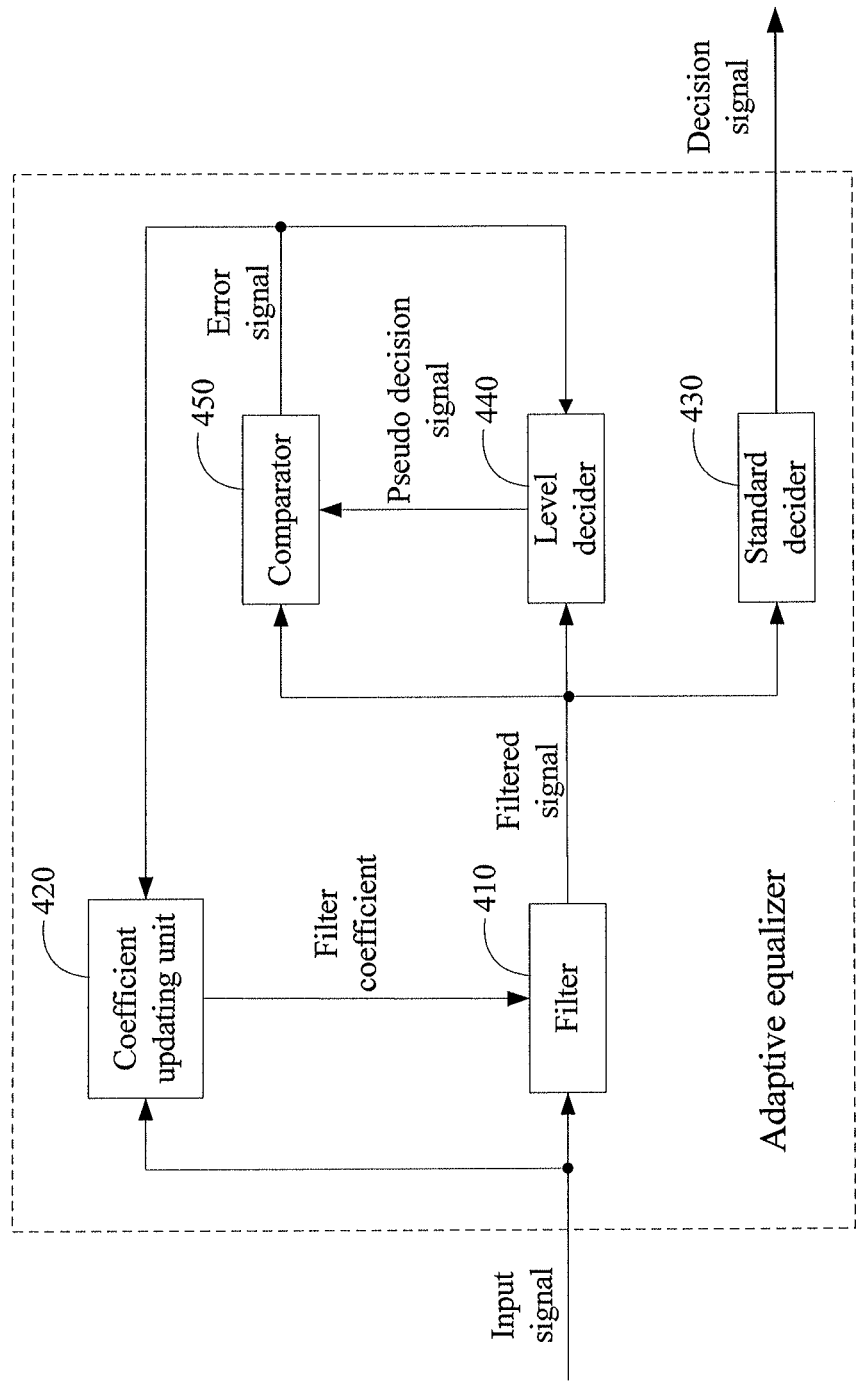
FIG. 4 is a structural block diagram of an adaptive equalizer according to an embodiment of the present disclosure.

An embodiment of the present disclosure provides an adaptive equalizer, whose structure is illustrated in FIG. 4, including:

a filter 410, configured to filter input signals according to a first filter coefficient to obtain a first filtered signal, and further configured to filter the input signals according to a second filter coefficient to obtain a second filtered signal;

where the filter 410 may be implemented by an FIR filter.

a coefficient updating unit 420, configured to buffer the input signals to obtain buffer signals, and further configured to obtain an update magnitude of the filter coefficient according to a level (n−1) error signal and the buffer signals, and obtain the second filter coefficient according to the update magnitude;

a standard decider 430, configured to decide the first filtered signal based on an original constellation map to obtain a first decision signal, and further configured to decide the second filtered signal based on the original constellation map to obtain a second decision signal;

a level decider 440, configured to decide the first filtered signal based on a level (n−1) constellation map to obtain a level (n−1) pseudo decision signal, and further configured to switch the level (n−1) constellation map to a level n constellation map if the average energy of the level (n−1) error signal is less than a level (n−1) threshold, where the level n constellation map is the original constellation map; and a comparator 450, configured to compare the level (n−1) pseudo decision signal with the first filtered signal to obtain the level (n−1) error signal;

where n is a positive integer greater than 1.

Figure 5:
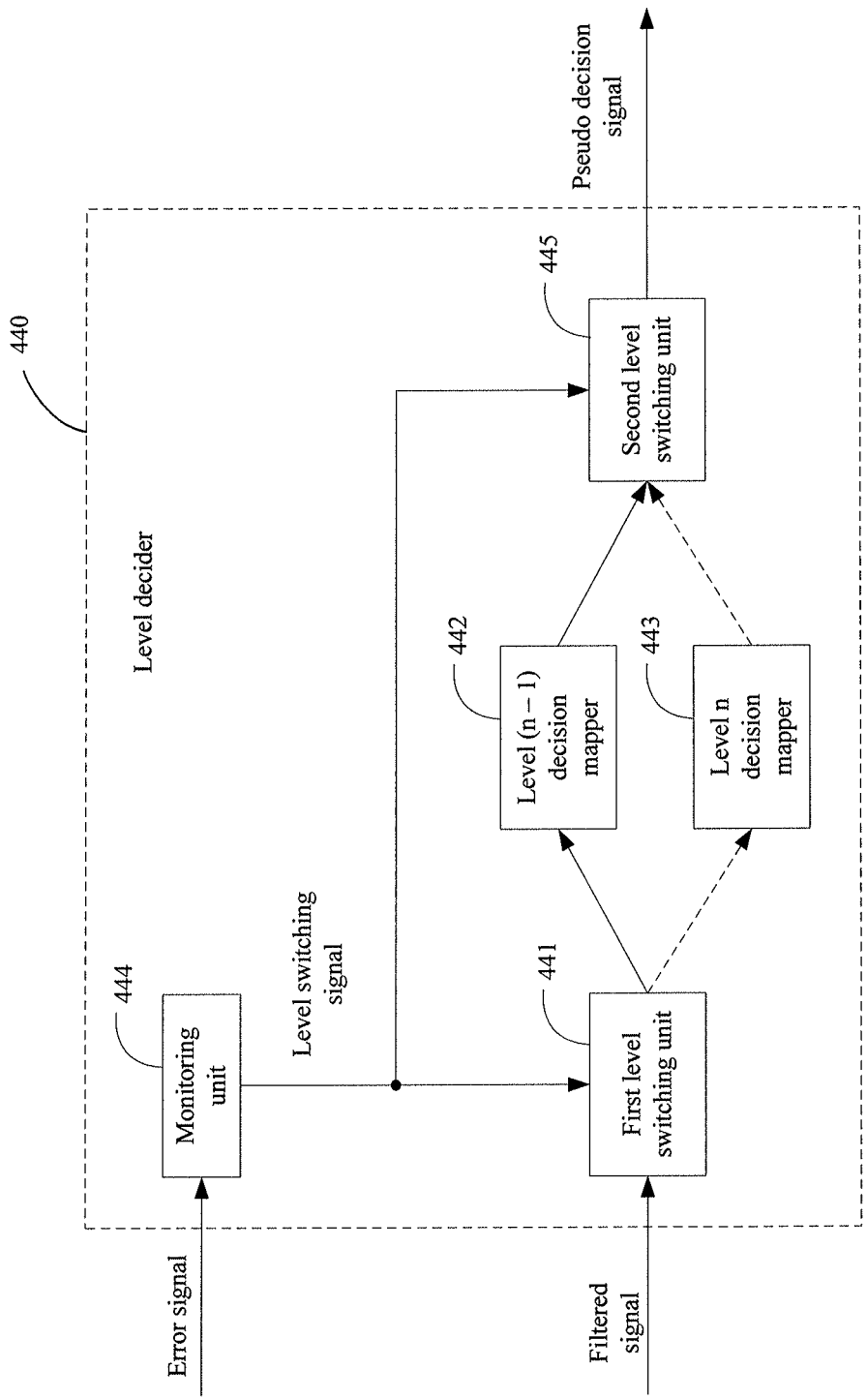
FIG. 5 is a structural block diagram of a level decider of the adaptive equalizer according to an embodiment of the present disclosure.

In another embodiment, the level decider 440 may include a first level switching unit 441, a level (n−1) decision mapper 442, a level n decision mapper 443, a monitoring unit 444, and a second level switching unit 445, as shown in FIG. 5.

The first level switching unit 441 is configured to receive the first filtered signal and connect the level (n−1) decision mapper 442, and further configured to switch from connecting the level (n−1) decision mapper 442 to connecting the level n decision mapper 443 when a level switching signal instructs switching.

The broken lines in FIG. 5 indicate: switching from connecting the level (n−1) decision mapper 442 to connecting the level n decision mapper 443 when the level switching signal instructs switching.

The level (n−1) decision mapper 442, where the level (n−1) constellation map is located in the level (n−1) decision mapper 442, is configured to decide the first filtered signal based on the level (n−1) constellation map to obtain the level (n−1) pseudo decision signal.

The level n decision mapper 443, where a level n constellation map is located in the level n decision mapper 443 and the level n constellation map is the original constellation map.

The monitoring unit 444 is configured to instruct switching by a level switching signal if the average energy of the level (n−1) error signal is less than the level (n−1) threshold.

The level (n−1) threshold $Td_{n-1}$ is determined by the average error $e_{n-1}$ between the level (n−1) constellation map and the original constellation map in the aggregation area of the level (n−1) constellation map: $Td_{n-1} = \alpha \times e_{n-1}$, where, $1 < \alpha < 1.5$.

The aggregation area of the level (n−1) constellation map is an area covered by one constellation point in the level (n−1) constellation map in the original constellation map, and the area covered in the original constellation map is formed by partition by a decision partition line in the level (n−1) constellation map. The thresholds corresponding to the decisions may be determined by calculation during the process of constructing the level decision constellation maps by aggregating the constellation points level by level.

The second level switching unit 445 is configured to connect the level (n−1) decision mapper 442 and output the level (n−1) pseudo decision signal, and further configured to switch from connecting the level (n−1) decision mapper 442 to connecting the level n decision mapper 443 when the level switching signal instructs switching.

The broken lines in FIG. 5 indicate: switching from connecting the level (n−1) decision mapper 442 to connecting the level n decision mapper 443 when the level switching signal instructs switching.

Further, the first level switching unit 441 is configured to receive the second filtered signal; the level n decision mapper 443 is configured to decide the second filtered signal based on the level n constellation map to obtain the level n pseudo decision signal; and the second level switching unit 445 is configured to output the level n pseudo decision signal.

Further, the level decider 440 may include a constellation map obtaining module 446, configured to aggregate constellation points based on the level n constellation map to obtain the level (n−1) constellation map.

The constellation map obtaining module 446 may include a constellation map obtaining submodule 4461, configured to: in the four quadrants of a coordinate system, group all constellation points in the level n constellation map into regular areas, where the regular areas satisfy the following two conditions: the regular areas are contiguous, and one regular area cannot be blocked by another; and the number of covered original constellation points in regular areas at the same level is the same, and the relative positions of the original constellation points in the regular areas are the same; and further configured to use the centroid point of each regular area as a new constellation point and use the perpendicular bisector of each centroid point as a decision partition line for the new constellation points, to obtain the level (n−1) constellation map.

In another embodiment, the coefficient updating unit 420 may include a buffer 421 and a coefficient updating subunit 422.

The buffer 421 is configured to buffer the input signals to obtain buffer signals.

The coefficient updating subunit 422 is configured to obtain an update magnitude of the filter coefficient according to the level (n−1) error signal and the buffer signals, and obtain the second filter coefficient according to the update magnitude.

The update magnitude of the filter coefficient may be calculated by using common adaptive algorithms such as LMS and RLS, according to the level (n−1) error signal and the buffer signals; and the second filter coefficient may be obtained according to the update magnitude.

The information interaction between modules of the adaptive equalizer and the execution process thereof according to the above embodiments are based on the same concept as the method embodiments of the present disclosure. Therefore, reference may be made to the description of the method embodiments of the present disclosure for details, which will not be described herein again.

According to the adaptive equalization method and the adaptive equalizer provided in the embodiments of the present disclosure, when the constellation map of the decision signal is adjusted in initial conditions, a greater p value is generated to increase random excitation energy, thereby increasing the convergence speed, enlarging the range of the optimal search, and enhancing the blind convergence capability. With the convergence of the adaptive equalizer, the original constellation map of the decision signal is gradually recovered, and the p value is gradually reduced, thereby reducing the minimum convergence error $J_{min}$. The solutions provided in the embodiments of the present disclosure are capable of maintaining inherent features of the filter in the adaptive equalizer, and improving the convergence speed and blind equalization convergence capability while ensuring the convergence error.

Persons of ordinary skill in the art should understand that all or a part of the steps of the methods in the embodiments may be implemented by a computer program instructing relevant hardware. The program may be stored in a computer readable storage medium. When the program runs, the processes of the methods in the embodiments are performed. The storage medium may be a magnetic disk, an optical disk, a read-only memory (Read-Only Memory, ROM), a random access memory (Random Access Memory, RAM), and the like.

The foregoing descriptions are merely exemplary embodiments of the present disclosure, but not intended to limit the protection scope of the present disclosure. Any variation or replacement that can be easily made by persons skilled in the art without departing from the scope disclosed by the present disclosure shall fall within the protection scope of the present disclosure. Hence the protection scope of the present disclosure shall be subject to the appended claims.

What is claimed is:

1. An adaptive equalizer, comprising:
a filter, configured to filter input signals according to a first filter coefficient to obtain a first filtered signal, and further configured to filter the input signals according to a second filter coefficient to obtain a second filtered signal;
a coefficient updating unit, configured to buffer the input signals to obtain buffer signals, and further configured to obtain an update magnitude of the filter coefficient according to a level (n−1) error signal and the buffer signals, and obtain the second filter coefficient according to the update magnitude, wherein n is a positive integer greater than 1;
a standard decider, configured to decide the first filtered signal based on an original constellation map to obtain a first decision signal, and further configured to decide the second filtered signal based on the original constellation map to obtain a second decision signal;
a level decider, configured to decide the first filtered signal based on a level (n−1) constellation map to obtain a level (n−1) pseudo decision signal, and further configured to switch the level (n−1) constellation map to a level n constellation map if average energy of the level (n−1) error signal is less than a level (n−1) threshold, wherein the level n constellation map is the original constellation map; and
a comparator, configured to compare the level (n−1) pseudo decision signal with the first filtered signal to obtain the level (n−1) error signal;
wherein the level decider comprises:
a first level switching unit, configured to receive the first filtered signal and connect a level (n−1) decision mapper, and further configured to switch from connecting the level (n−1) decision mapper to connecting a level n decision mapper when a level switching signal instructs switching;
the level (n−1) decision mapper, wherein the level (n−1) constellation map is located in the level (n−1) decision mapper, and the level (n−1) decision mapper is configured to decide the first filtered signal based on the level (n−1) constellation map to obtain the level (n−1) pseudo decision signal;
the level n decision mapper, wherein the level n constellation map is located in the level n decision mapper, and the level n constellation map is the original constellation map;
a monitoring unit, configured to instruct switching by the level switching signal if the average energy of the level (n−1) error signal is less than the level (n−1) threshold; and
a second level switching unit, configured to connect the level (n−1) decision mapper and output the level (n−1) pseudo decision signal, and further configured to switch from connecting the level (n−1) decision mapper to connecting the level n decision mapper when the level switching signal instructs switching.

2. The adaptive equalizer according to claim 1, wherein:
the first level switching unit is further configured to receive the second filtered signal;
the level n decision mapper is further configured to decide the second filtered signal based on the level n constellation map to obtain a level n pseudo decision signal; and
the second level switching unit is further configured to output the level n pseudo decision signal.

3. The adaptive equalizer according to claim 1, wherein the level decider further comprises a constellation map obtaining module, configured to aggregate constellation points based on the level n constellation map to obtain the level (n−1) constellation map.

4. The adaptive equalizer according to claim 1, wherein the level (n−1) threshold is determined by an average error between the level (n−1) constellation map and the original constellation map in an aggregation area of the level (n−1) constellation map: $Td_{n-1} = \alpha \times e_{n-1}$, wherein:

$1 < \alpha < 1.5$;

$Td_{n-1}$ indicates the level (n−1) threshold;
$e_{n-1}$ indicates the average error between the level (n−1) constellation map and the original constellation map in the aggregation area of the level (n−1) constellation map; and
the aggregation area of the level (n−1) constellation map is an area covered by one constellation point in the level (n−1) constellation map in the original constellation map, and the area covered in the original constellation map is formed by partition by a decision partition line in the level (n−1) constellation map.

5. An adaptive equalization method, comprising:
filtering input signals according to a first filter coefficient to obtain a first filtered signal, and buffering the input signals to obtain buffer signals;
deciding the first filtered signal based on an original constellation map to obtain a first decision signal, and deciding the first filtered signal based on a level (n−1) constellation map to obtain a level (n−1) pseudo decision signal, wherein n is a positive integer greater than 1;
comparing the level (n−1) pseudo decision signal with the first filtered signal to obtain a level (n−1) error signal;
if average energy of the level (n−1) error signal is less than a level (n−1) threshold, switching the level (n−1) constellation map to a level n constellation map, wherein the level n constellation map is the original constellation map; and obtaining an update magnitude of the filter coefficient according to the level (n−1) error signal and the buffer signals, and obtaining a second filter coefficient according to the update magnitude;
filtering the input signals according to the second filter coefficient to obtain a second filtered signal; and
deciding the second filtered signal based on the original constellation map to obtain a second decision signal;
wherein the level (n−1) constellation map is obtained by aggregating constellation points based on the level n constellation map, comprising:

in four quadrants of a coordinate system, grouping all constellation points in the level n constellation map into regular areas, wherein the regular areas satisfy the following two conditions:

the regular areas are contiguous, and one regular area cannot be blocked by another; and the number of covered original constellation points in regular areas at the same level is the same, and relative positions of the original constellation points in the regular areas are the same; and using a centroid point of each regular area as a new constellation point, and using a perpendicular bisector of each centroid point as a decision partition line for the new constellation points to obtain the level (n−1) constellation map.

6. The method according to claim 5, further comprising deciding the second filtered signal based on the level n constellation map to obtain a level n pseudo decision signal.

7. The method according to claim 5, wherein when n=2, the level (n−1) constellation map is a constellation map in a four-constellation-point quadrature amplitude modulation shape, wherein each quadrant includes only one constellation point.

8. The method according to claim 5, wherein the level (n−1) threshold is determined by an average error between the level (n−1) constellation map and the original constellation map in an aggregation area of the level (n−1) constellation map: $Td_{n-1} = \alpha \times e_{n-1}$, wherein:

$1 < \alpha < 1.5$;

$Td_{n-1}$ indicates the level (n−1) threshold;

$e_{n-1}$ indicates the average error between the level (n−1) constellation map and the original constellation map in the aggregation area of the level (n−1) constellation map; and the aggregation area of the level (n−1) constellation map is an area covered by one constellation point in the level (n−1) constellation map in the original constellation map, and the area covered in the original constellation map is formed by partition by a decision partition line in the level (n−1) constellation map.

* * * * *